Figure 1:
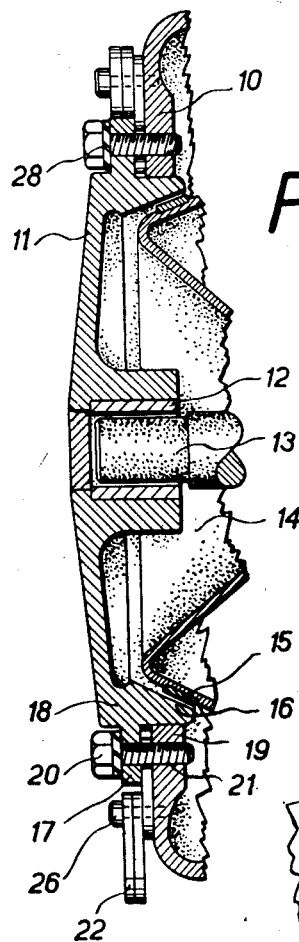

July 26, 1960 — F. MUNCK — 2,946,906
ELECTRIC MOTOR FOR HOISTS, CRANES, CONVEYORS OR THE LIKE
Filed Dec. 16, 1958

INVENTOR:
FREDRIK MUNCK.
BY Richards & Geier
ATTORNEYS

United States Patent Office 2,946,906
Patented July 26, 1960

2,946,906

ELECTRIC MOTOR FOR HOISTS, CRANES, CONVEYORS OR THE LIKE

Fredrik Munck, Bergen, Norway, assignor to Sverre Munck, trading as Sverre Munck Elektro-Mekanisk Industri, Bergen, Norway Filed Dec. 16, 1958, Ser. No. 780,834

1 Claim. (Cl. 310—77)

This invention relates to electric motors for hoists, cranes, conveyors or the like and particularly to electric motors of the kind comprising an axially movable rotor provided at one end with brake shoes arranged to co-act with a brake drum of an axially adjustable end cover.

Electric motors of the above kind are used in electro-mechanical machinery wherein a braking effect is desired when the current is switched off and the motor is at rest, for instance for operating hoists, cranes, travelling crabs, elevators, conveyors, and the like. Braking is effected when the magnetic field between stator and rotor is sufficiently reduced, by spring means which displace the rotor axially and thereby urge the brake shoes of the rotor into engagement with the brake drum of the end cover. By this means the rotor will be braked and brought to rest when the current is cut off. Conventionally, the rotor is of frusto-conical shape for co-operation with a correspondingly frusto-conical stator and when a sufficiently high voltage is applied to the motor windings, the rotor is pulled axially inwards into the stator and the braking engagement of the rotor with the brake drum will be released allowing rotation of the rotor to take place.

Usually, the brake shoes and the corresponding brake drum have a frusto-conical shape in an opposed relationship to the frusto-conical shapes of the rotor and stator.

In order to adjust the braking engagement between the brake shoes and the brake drum, the brake drum must be axially adjustable. In known arrangements the brake drum is secured to the inner side of the end cover and for this reason the end cover must be axially adjustable.

It is possible, per se, to obtain such adjustment by forming screw threads on the end cover for co-operation with corresponding threads on the motor housing proper. However, such arrangement is expensive, and several of the arrangements of this general character proposed in the past have disadvantages in other respects too.

Another possibility is to employ a number of spacing discs or washers mounted on bolts for fixing the end cover to the motor housing. This arrangement will not give any advantageous solution either, as it will generally involve removal of the entire cover in order to remove or to add spacing discs.

The object of the present invention is to obtain a very simple and inexpensive arrangement, whereby exact adjustment of the rotor in an axial direction is always possible and the need for removing the end cover during adjustment avoided thereby eliminating the risk of any loose parts becoming lost.

According to the present invention there is provided an electric motor for hoists, cranes or the like comprising an axially displaceable rotor provided at one end with a first brake means engageable with a counterpart brake means arranged on an end cover of the housing, the rotor being urged axially in one direction when the current is shut off so as to bring the co-operating brake means into engagement for applying a braking effect to the rotor, and axially in the opposite direction to allow it to rotate when the current is switched on, which is characterized in that a number of sets or groups of spacing members are provided and the members of each set mounted to swing about a common pivot adjacent to one of the fixing bolts of the end cover so that the members are held captive on said housing, the arrangement being such that said spacing members may be pivoted into or from a position between the end cover and the motor housing to permit axial movement of the cover towards or away from the housing to adjust the spacing between the co-operating brake means during rotation of the rotor.

Figure 2:
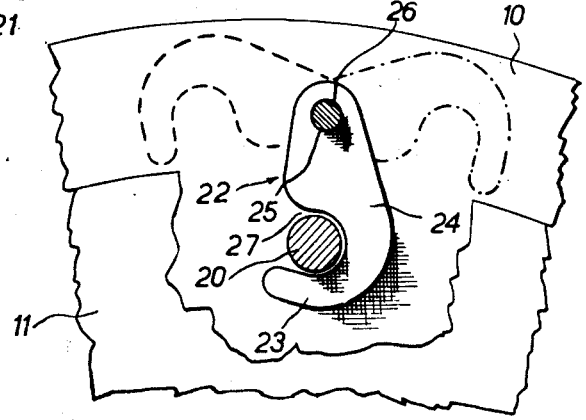

The invention will now be described, by way of example, with reference to the accompanying drawings, wherein:

Figure 1 is an axial sectional view of the end part of the motor housing of an electric travelling hoist, showing the means for effecting adjustment of the end cover and the brake surface carried thereby, and Figure 2 is a fragmentary plan or face view, showing the spacing members.

Referring to the drawings, an electric motor of the kind referred to for a travelling hoist or the like comprises a housing 10 closed at the rear end by a cover 11. Centrally, said cover carries a bearing 12 for a stud 13 of the rotor, the latter not being fully shown. However, the end part of the rotor is indicated at 14, and this end part is provided with frusto-conical brake shoes 15 which co-act with a frusto-conical brake drum 16 forming an integral part of the end cover 11.

This end cover is provided with an outwardly directed annular flange 17 and an axially directed cylindrical flange 18. The inner face of the flange 18 constitutes the brake drum 16 whereas the outer face of said flange 18 guides the end cover by co-operating with an inwardly directed annular flange 19 of the housing 10.

Fixing screws or bolts 20 keep the end cover 11 in position on the housing these screws passing through holes in the end cover flange 17 and screwing into threaded holes 21 of the annular flange 19 of the housing 10.

In order to ensure correct spacing between the end cover 11 and the housing 10, there are provided sets or groups of spacing members generally designated by reference numeral 22, the shape of such spacing members being clearly illustrated in Figure 2.

Each of said spacing members comprises a hook shaped end part 23 and an extended part 24 provided with a hole 25. As seen from Figure 1, a number of such spacing members 22 of each set are pivoted on the shank of a headed stud 26 and each stud is mounted on the flange 19 of the housing 10 outside the outer edge of the end cover 11.

The hook shaped part 23 of each spacing member 22 defines a semi-circular recess 27, for engaging over the bolts 20 when the spacing members 22 are pivoted about the studs 26 from an out of use position to a position wherein one or more spacing members of each set is or are interposed between the end cover 11 and the annular flange 19 of the housing 10. By providing a suitable number of such spacing members 22 for engaging each screw bolt 20, pivotation of a spacing member 22 of each set to swing it out of engagement with the associated bolt 20 enables the end cover 11 to be moved inwardly a distance corresponding to the thickness of the spacing member, without it being necessary to remove the end cover 11 or any other part, the fixing bolts 20 being slackened slightly to permit swinging of the members 22 and then re-tightened.

Because the spacing members 22 are permanently connected to the housing 10, by being pivotally mounted on the studs 26, they may easily be pivoted back into positions of use to support the end cover at an axial distance from the rotor which is increased by the thickness of each spacing member 22.

As is conventional practice in the art, a locking washer 28 is provided on each bolt 20 to prevent the bolts becoming inadvertently loosened.

It is obvious that by means of the present invention adjustment of the end cover 11 can be made without the removal of the end cover 11 being necessary, as has previously been necessary when using spacing discs. Such removal is specifically disadvantageous in electric motors of the kind referred to for hoists or the like because the rotor, as mentioned, is permanently urged outwardly axially in a braking direction, in order to obtain the desired engagement between the brake shoes and the brake drum. Further, it is quite easy to manufacture the spacing members 22 of this invention with a high degree of accuracy, whereas conventional spacing discs usually vary considerably in thickness. Also, the spacing members are always captive and it will be easy to deduce from the number of spacing members brought to a position of use whether the brake shoes should be changed.

A suitable number of such spacing members 22 of each set may be between three and six, according to the requirements, and, among other factors, depending on the thickness of the spacing members themselves. Any desired number of sets of spacing members may be provided on the housing 10 around the periphery of the cover 11, corresponding generally to the number of fixing bolts 20.

What I claim is:

In an electric motor for hoists, cranes, and the like, in combination with a housing, a cover, a rotor rotatably and axially displaceably mounted within said housing and in said cover, and a number of fixing bolts carried by a portion of said cover and secured to said housing for adjusting said cover axially relatively to said rotor, said cover comprising brake drum means located within said housing, said rotor comprising brake shoe means adapted to engage said brake drum means for braking said rotor; a number of headed studs carried by said housing, the number of said headed studs being equal to that of said fixing bolts, each headed stud being located adjacent a separate fixing bolt, and a plurality of spacing members mounted for pivotal swinging movement upon said headed studs, each headed stud carrying at least one spacing member, each spacing member comprising a hook-shaped portion adapted to embrace the adjacent fixing bolt and to be interposed between said portion of the cover and the housing in an operative position of the spacing member, and to be withdrawn from the space between said portion of the cover and the housing into an inoperative position to allow for said axial adjustment of the cover.

References Cited in the file of this patent

UNITED STATES PATENTS

| | | |
|---|---|---|
| 1,771,281 | Wilsing | July 22, 1930 |
| 2,462,017 | Willits | Feb. 15, 1949 |